Patented Nov. 16, 1943

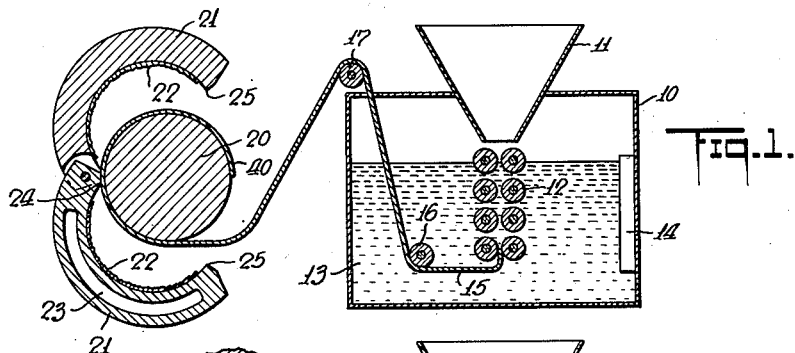
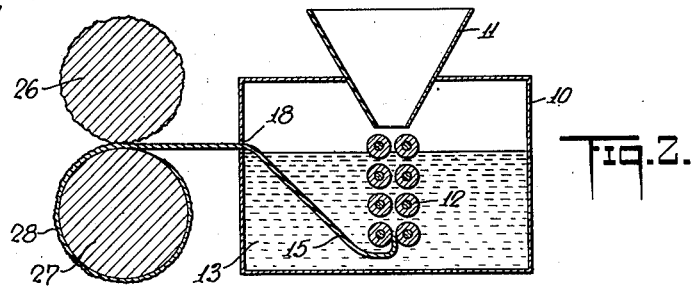
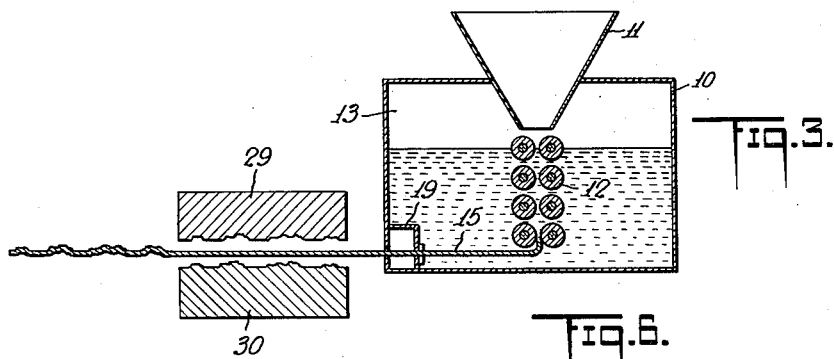
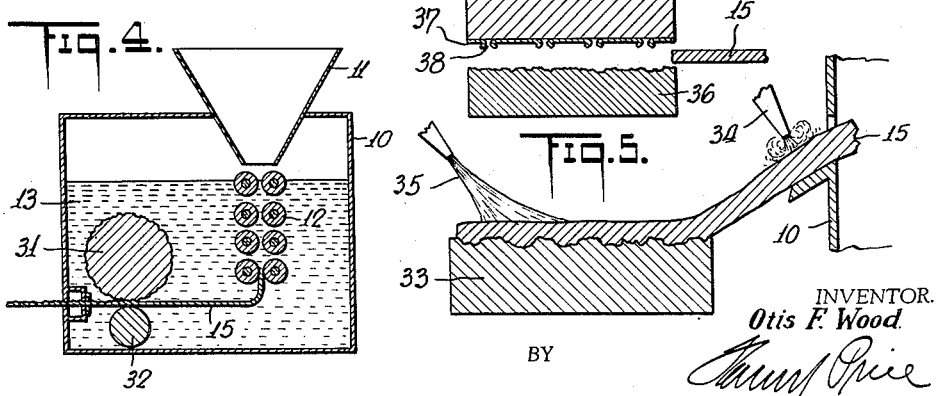
INVENTOR.
Otis F. Wood
BY
ATTORNEY.

2,334,233

UNITED STATES PATENT OFFICE 2,334,233

METHOD OF TREATING AND SHAPING PLASTIC MATERIAL

Otis F. Wood, New York, N. Y.; Elizabeth Brower Wood Distler administratrix C. T. A. of said Otis F. Wood, deceased Application December 6, 1938, Serial No. 244,172

3 Claims. (Cl. 18—47.5)

The present invention relates to methods and means for treating, handling, forming, molding natural and synthetic resins, gums, protein materials, such as glues, gelatin, caseins, cellulose derivatives and so forth.

Although not restricted thereto, the present invention will be particularly described in connection with the handling and forming of resinous and similar plastic materials in the making of various formed articles, such as printing plates, buttons, electrical equipment, gears, cover elements, closures, handles, hardware plates, handles, stands, pipe and cigarette holder elements, combs, jewelry, panel boards, boxes, ornaments, and so forth from such resins.

In forming articles from various plastics such as resinous gums, cellulose derivatives, casein products and so forth, it is usually necessary to make expensive molds capable of applying relatively high temperatures and pressures to the resinous, cellulosic, protein or other plastic materials to be formed which greatly increases the expense and cost of these materials when formed, and in addition considerable time is usually consumed in the various operations which must be utilized in connection with the molding of these resinous materials under heat and pressure.

It is the object of the invention to provide a method by which it will be possible most readily to form, handle and otherwise manipulate plastic materials, such as resinous, gummy, cellulosic, protein or similar materials without the necessity of utilizing expensive molds and with assurance that the molded objects or formed objects to be produced will be obtained at a minimum of cost.

Other and further objects and advantages will also appear from the more detailed description given below, it being understood however, that this more detailed description is given by way of illustration and explanation only and not by way of limitation, since various changes therein may be made by those skilled in the art without departing from the scope and spirit of the present invention.

I accomplish the objects by treating, handling or manipulating these plastic materials, either in powder, lump, pasty or liquid form, in a non-solvent hot or boiling liquid, such as an oil, wax or ester, preferably having a boiling point substantially above 100° C., or even in a molten metal, which will be relatively inert toward these plastic materials, and at the same time will soften them so that they may be readily formed and shaped and will quickly harden when cooled to atmospheric temperature.

According to one method of accomplishing the above invention, the resin, gum, cellulosic or other plastic powder is placed in or caused to pass through a hot or boiling liquid having a temperature substantially over 150° F. and desirably over 212° F., such liquids for example being various types of turpentine, oils, hydrocarbons and so forth.

In this liquid, the resinous or other plastic materials may be worked to obtain thorough treatment of the entire plastic mass. The softening of such plastic mass is obtained without such plastic mass being dissolved or caused to disintegrate or carbonize.

The softened resinous, gummy, protein or cellulosic material after having been treated in the hot or boiling liquid and after desirable softening thereof, can be initially formed in the hot or boiling inert, non-solvent liquid or it can be formed after extrusion as a sheet, rod or tube.

After extrusion from the bath, the sheet of plastic material in softened condition can be caused to conform to a matrix or other form, or can be caused to flow into a mold or it may be pressed into various shapes. After the sheet, rod or tube has thus been formed it is allowed to cool to harden it and such cooling may be accelerated by application of cooling fluids, such as air, gases or water.

Before the resin, gum, protein, cellulosic or other powder or material is introduced into or passing through the hot or boiling liquid, a liquid hydrocarbon, ester, ketone, ether or alcohol solvent may be incorporated in it in such small amounts as to convert such material into a viscous liquid or plastic jelly and this liquid or paste or jelly may then be placed or introduced into the boiling liquid.

On the other hand sufficient of the solvent may be introduced separately into the boiling or heated liquid which is used for softening or modifying the resinous material.

These solvents may be so regulated that the boiling liquid will have such affinity for them as to draw desired amounts of the solvent away from the resinous, gummy or other plastic material so that it may be more readily hardened when it is cooled to atmospheric or room temperature.

On the other hand such solvent or softening materials may be added to the boiling inert liquid as will desirably effect the hardness or plasticity of the resinous material after it is removed from the boiling bath.

The boiling point of the softening liquid may be modified by addition of materials thereto, as for example by incorporating together different materials having different boiling points and in some instances immiscible liquids may be combined together so that there will be two layers formed in the boiling bath, a liquid of lower specific gravity floating on top of the liquid with higher specific gravity.

Molten metals may also be readily employed, the preferred metals being alloys, such as for example of bismuth, antimony, copper, tin and so forth, which may be given predetermined melting or boiling points by controlling the composition of the alloy. Mercury may also be employed.

In general any desired softening temperature from 150° F. up to 600 to 700° F. may be obtained by control of the character and composition of the boiling inert liquid and the softness and hardness of the resin or similar plastic material may be controlled by regulating the plasticizers or solvents included in such resinous material or in the hot or boiling liquid and by regulating the affinity of such hot or boiling liquid for such resinous materials.

Although generally the resinous or other plastic materials may be treated at atmospheric pressure, it is also possible to use pressures above and below atmospheric, and if desired, to jacket the vessels in which the treatment is carried out so that a desired predetermined pressure and temperature may be employed within the vessel containing the hot or boiling liquid.

Where the hot or boiling liquid will extract the solvent or softening material from the resin, it is often possible to cast the resin gum or other plastic directly in the boiling liquid, with solidification and final hardening taking place substantially immediately upon removal of the resinous material from the liquid.

Various forms of waxes, fillers, pigments and so forth may, of course, be included in the resin or other plastic mixtures during the course of the treatment.

The boiling period may considerably vary and for example boiling periods from one minute up to several hours may be employed, depending upon the particular type of resinous material.

All types of resins or gums may be utilized and by way of example it is possible to take phenol-formaldehyde resins in their soluble moldable condition, with or without the addition of solvent or plasticizing agent, and boil or heat such resins in a wax or an oil of hydrocarbon, terpene, or glyceride nature.

Required results are obtained where the liquid treating agent, either in hot or boiling condition, will dissolve or remove or insert or introduce solvent or softening agents from or into the resinous or plastic material without dissolving the resinous material. Also the hot or boiling inert liquid may cause volatilization of the solvent or plasticizer.

In some cases the treating liquid may be of such a nature as to slightly plasticize the resinous or other plastic material.

For example with 100 parts of a dry phenol-formaldehyde molding powder, it is possible to use a finely divided molding powder or to make a paste using 5 to 10 parts of various glycol esters, ethyl acetate, benzene, amyl acetate and so forth. Then the powder or solvent combination may be boiled in from 5 to 10 parts its weight of a glyceride paint oil of the character above described from ¼ to 3 or 4 hours, desirably with kneading, depending upon the final product which it is desired to obtain.

With vinylite resins it is possible to use them as powders or to mix them first with 5 to 20% of aliphatic alcohols, ketones, esters, ether alcohols or chlorinated hydrocarbons having 1 to 6 carbon atoms. The boiling liquid may be vegetable or mineral oils, glycols, from 10 to 20 parts of resin being used for every 50 to 100 parts of boiling liquid.

If desired, it is also possible to leave the resin in plastic condition, as may be accomplished by adding plasticizers to the resinous material or other boiling oil, such plasticizers preferably being high melting point solvents, such as tri-phenyl-phosphate, tri-cresyl phosphate, ethyl lactate, butyl phthalate, amyl tartrate, ethyl phthalate and so forth, in which case the plastic material will be sufficiently soft that for example if it is a printing plate, it may be pressed into the pores or fibers of the sheet of paper or other material being printed with a much better reproduction of the printed matters thereupon.

By using soft or plasticized plastic printing plates of this character it is possible to eliminate offset process in many printing operations.

In the accompanying drawings are diagrammatically shown several arrangements according to which the objects of the present invention may be attained, Figs. 1 to 6 each respectively illustrating a different arrangement in side section.

In Figs. 1 to 5, the liquid-containing tank 10 is provided with a hopper 11 receiving the resinous or other plastic material in the form of a finely divided powder or granules or even a paste or viscous liquid. The hopper feeds the kneading rollers 12 which are immersed in the hot or boiling liquid 13. The liquid 13 is maintained at desired temperature by the steam coil 14.

The kneaded resin passes from the kneading rollers in the form of a sheet or rod 15 and then may be passed out of the top of the tank by the guide rollers 16 and 17 as in Fig. 1, through an outlet 18 above the liquid level in Fig. 2, or through a sealing box 19 in Fig. 3.

The plastic material may then be formed into semi-cylindrical printing plates as shown in Fig. 1, by being fed onto the cylinder or roller 20. The pivotally connected molding members 21 may carry the matrices 22 and be provided with cooling elements 23 and cutting elements positioned at 24 and 25.

As a result when the resin sheet 15 has been completely wrapped around the cylinder 20, the elements or members 21 will be closed against the cylinder forming and hardening the plastic sheet 15 and cutting it into two semi-cylindrical sections which may then be utilized as printing plates on a rotary press. Or the impressed sheet 40 in the form of a completed cylinder or tube may be utilized as such.

In Fig. 2, the plastic sheet 15 may be run between the forming rollers 26 and 27, one or both of which may carry matrices, engraving or embossments to impress a desired conformation into the sheet 15 before hardening. The formed sheet 28 may be removed in a straight line or it may be wrapped around a cylinder such as the lower roller 27.

In Fig. 3, the sheet 15 may be formed between the forming dies 29 and 30 which may be reciprocated by suitable means not shown.

In Fig. 4, the sheet 15 may be formed inside of the tank 10 by being passed between the forming rollers 31 and 32. The formed resin is then immediately removed from the tank.

In Fig. 5, the plastic or resin sheet 15 is permitted to flow into the recesses in a form, matrix or embossed or intaglio die 33. To make the material more plastic, a very hot fluid or gas may be blown against it by the blower 34 in one or both sides and at the same time after it has conformed itself or has flowed into the recesses of the matrix 33, a cooling fluid or gas 35 may be blown onto it to harden it.

In Fig. 6, the lower forming die 36 may cooperate with an upper die member 39 carrying a metal backing plate 37 having teeth 38 to engage and become permanently fastened into the resin sheet 15.

The arrangements shown are merely diagrammatic and many changes may obviously be made.

What is claimed is:

1. A process of forming printing plates from plastic materials, which comprises passing such plastic materials between kneading rollers in a boiling bath of a non-solvent liquid having a boiling point at the softening temperature of the plastic material and then removing the kneaded plastic in sheet form from said bath and while still plastic, moulding it to form a printing plate.

2. A method of forming a printing plate from a phenolformaldehyde molding powder, which comprises boiling 100 parts of the molding powder for from ¼ to 4 hours in an oil bath of from 5 to 10 parts by weight of a glyceride paint oil while kneading the plastic mass thereby formed in the bath, shaping it into sheet form and removing the sheet from the bath while still in plastic condition and then forming it into a printing plate.

3. A process of forming a plastic sheet material which comprises boiling resin in a bath inert thereto and kneading said resin while in said bath to render the same plastic, forming the material within the bath into a sheet and removing the sheet while still moldable from the bath.

OTIS F. WOOD.